United States Patent Office 3,392,615
Patented July 16, 1968

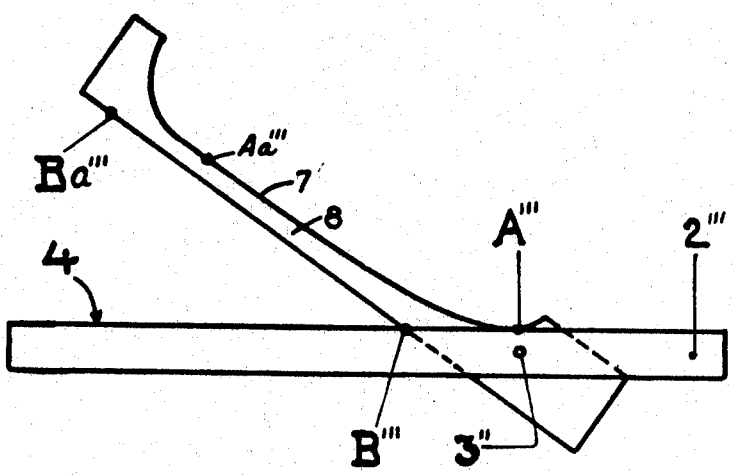
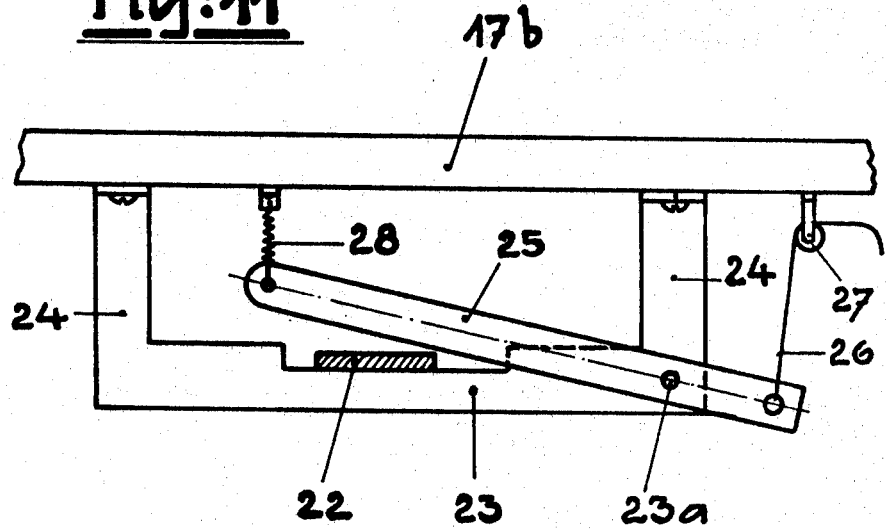

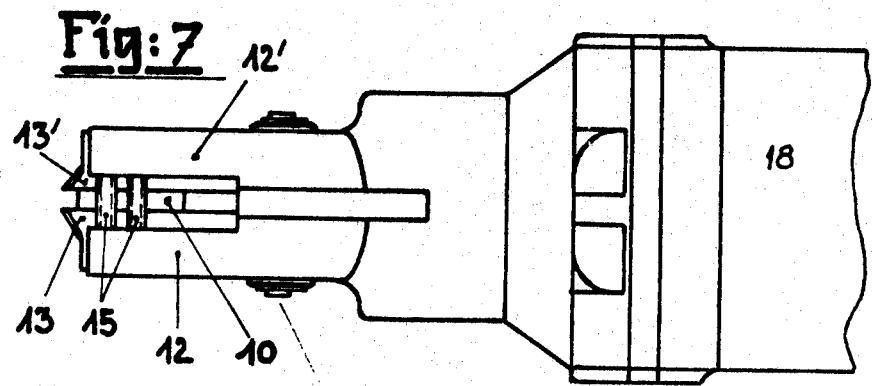
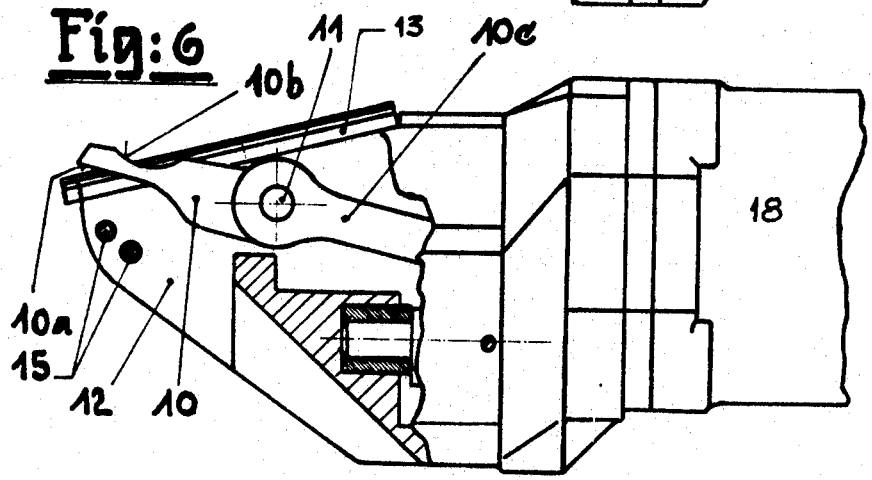
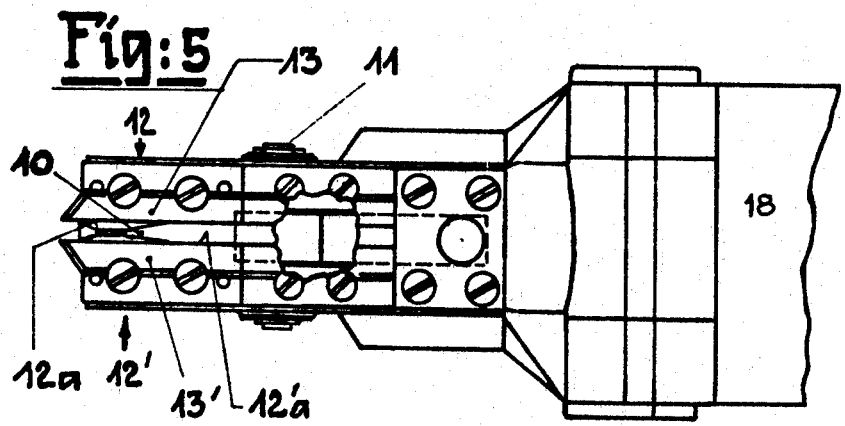

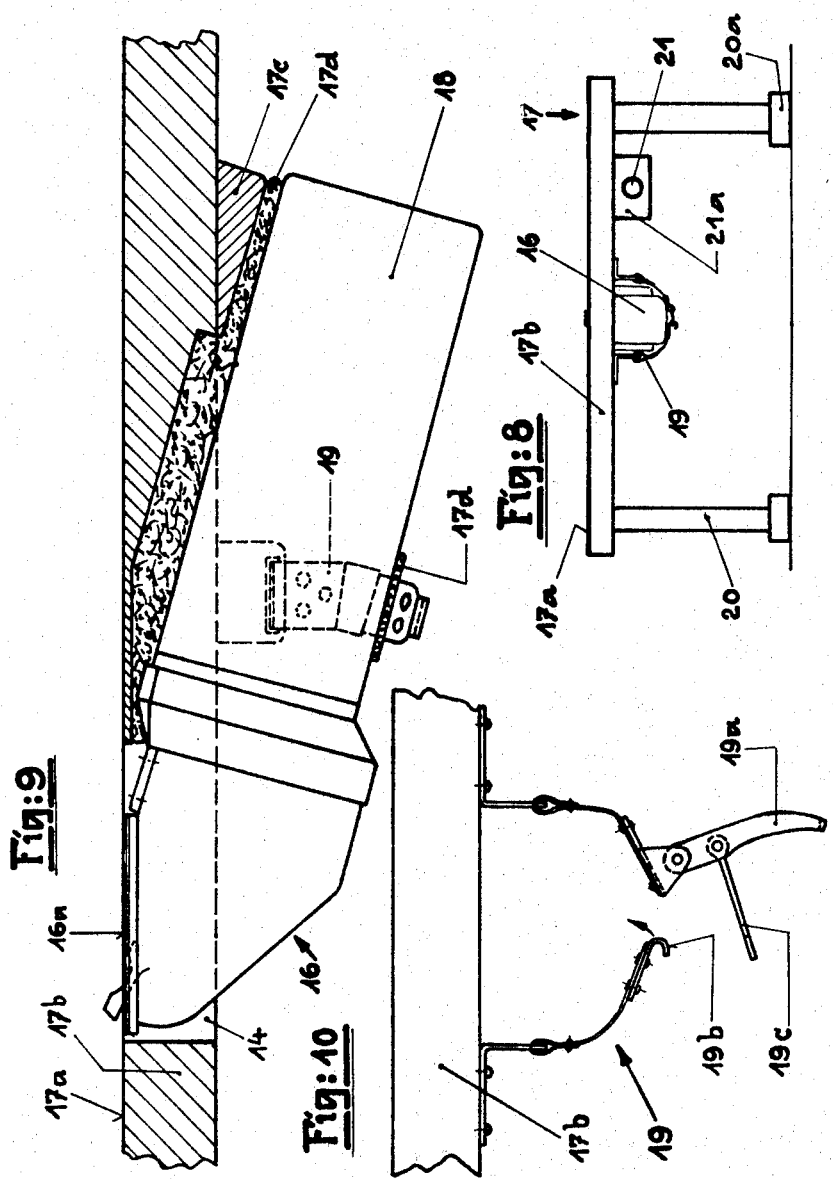

3,392,615
PATTERN CUTTING DEVICE
Wilhelm Rosskath, Holzgartenstrasse 38,
Nuremberg, Germany
Filed Dec. 7, 1965, Ser. No. 512,102
11 Claims. (Cl. 83—513)

ABSTRACT OF THE DISCLOSURE

A cutting device of the shear type having a pivoted cutting blade that projects upwardly above a table top and is provided with two parallel shearing anvils against which said cutting blade operates to remove a strip of material, the pivoted cutting blade having a rearward portion of diminishing width, and a depth equal to or smaller than the space between the shearing anvils.

---

The invention relates to a cutting device, and more particularly a cutting device for templates, comprising shears adapted to be mounted on a support and having two shearing anvils and a cutter pivotable between these and relative thereto. Hitherto, the majority of the patterns used in the garments industries had to be cut by hand, using scissors or knives. A device, known as a band knife, is used only rarely for very hard cardboard templates or patterns, because it is unsuitable for tight curves. Also an arrangement comprising a motor-driven saw is known, but patterns produced in this manner have burrs along the cut surfaces which must be subsequently removed.

It is also known to use shears with a cutter blade pivoted between two shearing anvils for cutting sheet metal and plastics. They are especially suitable for this purpose, because the cutter cannot escape laterally since it is guided by both anvils. On the other hand, when hard objects are cut with shears having a cutter and a single shearing anvil, the cutting pressure frequently displaces the cutter and the anvil laterally, causing the joint or the cutter or the anvil to be deformed and the material to be clamped between the two members. This does not occur with known sheet metal shears with two shearing anvils. Thus, the two anvils make these shears suitable for high cutting pressures. Both the basic construction and the overall dimensions of these sheet metal shears are determined by the required maximum cutting pressure. Thus, the back line of the cutter above the cutting edges forms a hump and the height of the cutter blade is generally larger than the width which corresponds usually to the distance between the cutting edges.

When cutting patterns from paper or cardboard, the cutting pressure is usually unimportant from the viewpoint of the construction of the tool. For manual operation, shears with a blade and a single anvil, that is to say, ordinary scissors are used. They have the advantage of producing clean cut edges without burrs or defects. However, they have the drawback that during the cutting of curves the material on the outside of the curvature must be deflected away from the plane of the sheet material, and with very tight curves there is the danger that the material will tear as the deflection will be sharp. In addition, the part of the material displaced by the scissors presses against the same so that the material must always be held in the desired position relative to the scissors, and is easily displaced when it is released. If this part of the material comes to rest on the moving cutter blade, it may easily be torn, especially with motor-driven shears. The manufacture of cardboard patterns for the garments industries, which have usually very curved shapes, is therefore never effected with motor-driven cutting tools. The sheet metal shears mentioned above, having cutters with small widths and great height, have the same disadvantages as ordinary scissors.

The present invention has the object of providing a device and scissors with two cutting anvils and a cutter blade, whereby patterns with curves of very small radius can be made quickly and easily without burrs or other deficiencies. According to the invention, the back line of the cutter blade is so shaped that a straight line passing through the crossing points of the cutting edges of cutter blade and anvils during the pivoting of the cutter blade between the shearing anvils can be turned at any time without the sheet material contacting the cutting blade because its height is equal to, or smaller than, the distance between the cutting edges of the cutter blade and is preferably constant or decreasing.

The use of such a cutting device makes it possible to manufacture pattern by machine. By selecting a suitable ratio between the distance between the rear line and the cutting anvils on the one hand and the distance between the cutting edges of the anvils on the other hand, patterns with short radius curves can be cut, and there is no risk of the parts of the sheet pattern material being moved out of its plane during the cutting. The design of the cutter blade according to the invention make possible not only the use of known sheet metal shears for cutting patterns, but enables for the first time the cutting of patterns by machine. If, according to the invention, the cross-section of the cutter blade tapers additionally from the cutting edges, the curves of the cut at which a formed part of the material just makes contact with the rear line of the cutter blade becomes even larger, so the radius it is possible to cut becomes smaller.

During cutting with the cutter according to the invention, a waste strip is formed whose width corresponds to the distance between the cutting edges of the cutter blade. During the cutting of curves, this strip is also curved. To prevent the strip from becoming fixed between the shearing anvils, the distance between the anvils on the top, within the zone of the cutting edges, is smaller than at the bottom. If the cutting device is so operated by means of a motor that the shearing anvils are stationary and the cutter blade moves, it is convenient to mount the cutting device on a table with the cutting edges of the shearing anvils parallel to and flush with the table top. The material can then be placed simply on the table and pushed between the anvils and the cutter. Since, for example, for cutting curves, a slower cutting speed is desirable than when cutting straight lines, a regulator is provided for varying the speed of the motor. To prevent the table from vibrating when the motor is running, the cutting device or the drive are mounted resiliently and the table legs are equipped with resilient bases. Usually an A.C. motor is used, in order to ensure quiet running. For cutting the waste strip during the cutting of the pattern, a cutting off arrangement may be provided under the table.

The accompanying drawing shows an embodiment of the device according to the invention. In the drawing:

FIG. 4 is a diagrammatic side elevation of the cutting device with a cutter blade according to the invention;

FIG. 5 is a top view of the cutting device;

FIG. 6 is a side elevation of the cutting device, partly cut away;

FIG. 7 is a view of the cutting device from the bottom;

FIG. 8 is an elevation of a table for making patterns, having the cutting device according to the invention mounted thereon;

FIG. 9 shows the cutting device mounted on the table top shown in cross-section;

FIG. 10 shows means for mounting the cutting device on a table top; and

FIG. 11 shows a waste material cutting off device.

Figure 1:
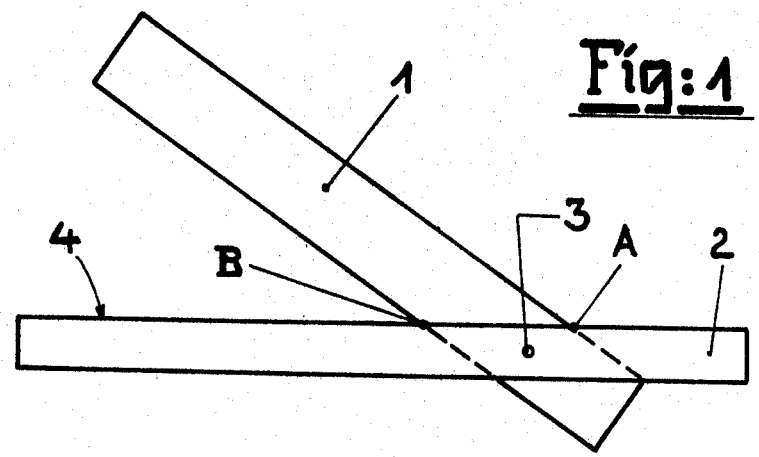
FIG. 1 is a diagrammatic side elevation of a cutting device with two shearing anvils and a cutting blade with large and uniform height.

In FIGURE 1 is seen a cutting device having cutting anvils 2 between which a cutting blade 1 is pivoted at 3 to act scissor-wise against each anvil. Blade 1 is here shown as a conventional rectangular blade so that, as the blade 1 descends between the anvils 2, the material on table top 4 being cut will bear for a distance A–B against each side of the blade 1. As the blade descends the distance A–B increases, so difficulty is encountered in cutting curved pieces.

Figure 2:
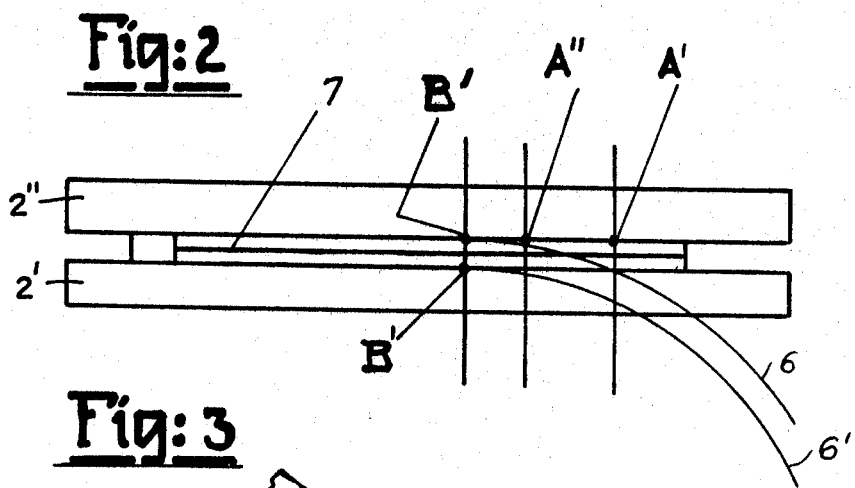
FIG. 2 is a diagrammatic top view of a cutting device seen also in FIG. 3.
Figure 3:
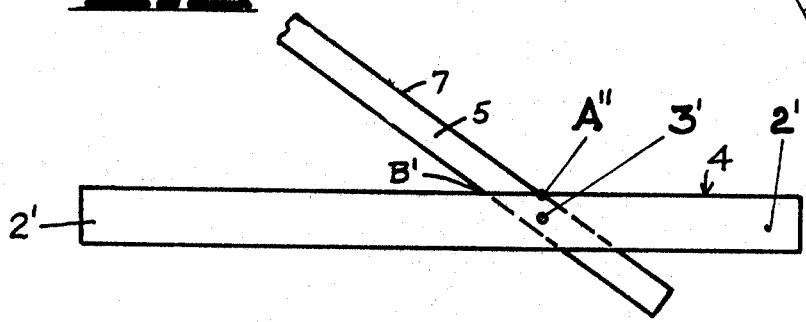
FIG. 3 is a diagrammatic side elevation of a cutting device, corresponding to FIG. 2, showing the cutter to have a smaller height.

In FIGURES 2 and 3 the anvils 2', 2" are the same as anvils 2 of FIGURE 1 but are in plan in FIG. 2.

If blade 5 were rectangular the material lying on the table would contact the sides of the blade from B' to A". The point A' in FIGURE 2 illustrates where the point A would fall in this figure if cutting blade 1 of FIGURE 1 were used. The arcs 6, 6 in FIGURE 2 show the cut out part where a curve is being cut. Such a curve cut could not be cut with blade 1, as is clear from the position of A' with respect to B'. The curve could not be cut if blade 5 were rectangular. Blade 5, however, may be made of triangular section with its apex on line 7 rearwardly, or upwardly of the blade; that is, the cutting blade narrows from said cutting face rearwardly.

FIGURE 4 shows a cutting blade 8 similar to the blade 5 of FIGURES 2 and 3 that has a saddle-shaped profile as seen in FIGURE 4, and narrows rearwardly to an apex tine 7'.

While the distance B''' to A''' is fairly great the arc that can be cut is of quite short radius and, due to the saddle-shape of the blade, this short radius can be cut for the entire cut, as seen by the indications of B$a'''$ and A$a'''$ on blade 8 that show the relative position of the intersection of the back 7' of the blade 8 with the cutting plane when the cutting blade is cutting at B$a'''$.

The cutter blade 10 in FIGS. 5, 6 and 7 is connected by a pivot 11 between the shearing anvils 12 and 12' and is actuated through a lever 10c from a motor mounting a housing 14. The cutting edge 10a is rectilinear. The configuration of the back line 10b of the cutter blade is realized in that the back of the cutter blade is saddle-shaped. As shown in FIG. 5, the front part of the blade 10 has a triangular cross-section. Plates 13 and 13' are screwed to the shearing anvils 12 and 12' and are provided with cutting edges 12a and 12a'. These plates are of specially hard material. As shown in FIG. 7, these plates 13 and 13' are spaced from each other a smaller distance than the anvils 12 and 12'. The anvils are held together in front by screws 15. In accordance with the distance between the anvils 12 and 12', the cutter blade 10 has according to FIG. 5 a larger width at the pivot 11 than at the cutting edge 10a.

According to FIGS. 8 and 9, the cutting device is so mounted on the table top 17 that the cutting edges 16a of its shearing anvils are parallel to the table surface 17a. For cutting patterns it is convenient to mount the cutting device 16 below the table top surface 17a so that the table top member 17b must be provided with a recess 14 corresponding to the dimensions of the shearing anvils. The cutting device 16 is held, with its housing 18 containing the driving motor, by means of a strap 19 which is made in two parts and is resilient, and which is adapted to be closed by means of a lever 19a, hooks 19b and eyelets 19c. To ensure that the cutting device 16a with the housing 18 is rigidly and accurately seated in the table top 17b, it is equipped with a bottom mounted wedge 17c. An elastic material, such as a foam plastic 17d is interpositioned between the cutting device 16 and the housing 18 and the table top 17b or the strap 19, to prevent the table from vibrating during operation. To this end, the legs 20 of the table 17 have bottom portions 20a of rubber (FIG. 8). A potentiometer 21a serves to adjust the speed of the motor for the cutting device 16.

FIG. 11 shows a cutting off device for the waste strip 22 formed during the cutting of the pattern. The cutting anvil 23 is mounted with its arm 24 on the table top 17b. The cutter blade 25 is connected with this anvil by means of a joint 23a, and is connected at one end with a rope 26 passing over rollers 27 mounted on the table top 17b. The cutting mechanism is closed by pulling the rope 26. A tension spring 28 mounted between the point of the cutter blade and the table top urges the cutter into the open position. For adapting the table to the size of the pattern to be cut, the table may be provided with hinged side members.

I claim:

1. A cutting device for sheet material comprising a pair of cutting anvils and a cutting blade pivoted between said anvils to shear out a strip of the sheet material between said anvils, said cutting blade being solid and having a cutting face and edge portions, and a back portion, said back portion narrowing from said cutting edge portions, the depth of the cutting blade at the plane of the cutting anvils being not greater than the distance between said cutting anvils, and electric motor means to actuate said cutting blade.

2. A device as claimed in claim 1, in which the back of the cutting blade is saddle-shaped.

3. A device as claimed in claim 1, in which the distance between the shearing anvils is larger adjacent their cutting edges than therebeyond, whereby curved severed material can pass readily therebetween.

4. A device as claimed in claim 1, including a regulator, such as a potentiometer, for varying the speed of said motor means.

5. A device as claimed in claim 1, also including a table, the cutting edges of the shearing anvils lying in the plane of the surface of said table and the cutting blade extending thereabove.

6. A device as claimed in claim 5 in which the table is equipped with wedges, blocks and the like forming supports for the cutting device.

7. A device as claimed in claim 6 in which the cutting device is resiliently mounted on the table, and the table has resilient legs.

8. A device as claimed in claim 7 in which foam plastic is interposed between the cutting device and the housing of the motor, and the table top.

9. A device as claimed in claim 6, also including a cut-off device mounted below said table top to cut the waste material strip formed during the manufacture of patterns.

10. A device as claimed in claim 9 in which the shearing anvil of said cutting device is mounted flush with the table top and the cutter blade of said cut-off device is connected to a rope passing over rollers.

11. A device as claimed in claim 10, in which the cutter blade of said cut-off device is held open by a spring.

References Cited

UNITED STATES PATENTS

| | | | |
|---|---|---|---|
| 1,918,838 | 7/1933 | Dunlap | 83—598 X |
| 1,928,845 | 10/1933 | Zaidan | 83—602 X |
| 2,934,822 | 5/1960 | Docken | 30—258 |

FOREIGN PATENTS 622,160    4/1949    Great Britain.

JAMES M. MEISTER, *Primary Examiner.*